US007324833B2

(12) United States Patent
White et al.

(10) Patent No.: US 7,324,833 B2
(45) Date of Patent: Jan. 29, 2008

(54) SYSTEM AND METHOD FOR CONNECTING A PORTABLE AUDIO PLAYER TO AN AUTOMOBILE SOUND SYSTEM

(75) Inventors: Russell W. White, Austin, TX (US); Kevin R. Imes, Austin, TX (US)

(73) Assignee: Affinity Labs, LLC, Austin, TX (US)

( * ) Notice: Subject to any disclaimer, the term of this patent is extended or adjusted under 35 U.S.C. 154(b) by 0 days.

(21) Appl. No.: 10/947,755

(22) Filed: Sep. 23, 2004

(65) Prior Publication Data

US 2005/0049002 A1 Mar. 3, 2005

Related U.S. Application Data

(63) Continuation of application No. 09/537,812, filed on Mar. 28, 2000, now Pat. No. 7,187,947.

(51) Int. Cl.
*H04Q 7/20* (2006.01)
(52) U.S. Cl. ............ 455/556.1; 455/566; 455/557
(58) Field of Classification Search ............ None
See application file for complete search history.

(56) References Cited

U.S. PATENT DOCUMENTS

| | | | | |
|---|---|---|---|---|
| 4,807,292 A | * | 2/1989 | Sorscher | 381/86 |
| 4,905,272 A | | 2/1990 | Van de Mortel et al. | 455/410 |
| 5,307,326 A | | 4/1994 | Osawa | 369/2 |
| 5,450,471 A | | 9/1995 | Hanawa et al. | 455/550.1 |
| 5,586,090 A | | 12/1996 | Otte | 369/2 |
| 5,587,560 A | | 12/1996 | Crooks et al. | 235/379 |
| 5,594,779 A | | 1/1997 | Goodman | |
| 5,694,120 A | | 12/1997 | Indekeu et al. | |
| 5,774,793 A | | 6/1998 | Cooper et al. | 455/418 |
| 5,870,680 A | | 2/1999 | Guerlin et al. | 455/557 |
| 5,900,564 A | | 5/1999 | Kurakake | |

(Continued)

OTHER PUBLICATIONS

U.S. Appl. No. 10/947,754, filed Sep. 23, 2004.

(Continued)

*Primary Examiner*—Erika A. Gary

(57) ABSTRACT

An audio system and method are disclosed. A system incorporating teachings of the present disclosure may include, for example, an electronic device having a display, a memory, an audio file player, and a housing component at least partially defining a cavity in which the memory and the audio file player are secured. In one embodiment, the electronic device may be a portable MP3 player. The system may also include a processor or playlist engine that can maintain a first playlist and a second playlist. In practice, the first playlist may include a selection of audio content having a corresponding audio file saved in the memory of the electronic device. In one embodiment, the system may also include an automobile having an automobile sound system that has a speaker and an in dash sound system component, which may be removably coupled to the electronic device via a cable. The in dash sound system component may have a selector, which may be, for example, a button, that allows a user to select the first playlist for outputting via the speaker. The cable interconnecting the electronic device and the in dash sound system component may be capable of providing power to the electronic device in addition to communicatively coupling the electronic device to the automobile sound system.

35 Claims, 9 Drawing Sheets

U.S. PATENT DOCUMENTS

| | | | |
|---|---|---|---|
| 5,940,767 A | 8/1999 | Bourgeois et al. | 455/349 |
| 5,953,005 A | 9/1999 | Liu | |
| 5,953,657 A | 9/1999 | Ghisler | 455/414.1 |
| 6,014,569 A | 1/2000 | Bottum | |
| 6,029,064 A | 2/2000 | Farris et al. | |
| 6,061,306 A * | 5/2000 | Buchheim | 369/2 |
| 6,088,730 A | 7/2000 | Kato et al. | |
| 6,144,848 A | 11/2000 | Walsh et al. | |
| 6,167,253 A | 12/2000 | Farris et al. | |
| 6,199,076 B1 | 3/2001 | Logan et al. | |
| 6,230,322 B1 * | 5/2001 | Saib et al. | 725/40 |
| 6,232,539 B1 * | 5/2001 | Looney et al. | 84/609 |
| 6,236,832 B1 | 5/2001 | Ito | |
| 6,240,297 B1 | 5/2001 | Jadoul | 455/557 |
| 6,247,130 B1 | 6/2001 | Fritsch | |
| 6,292,440 B1 * | 9/2001 | Lee | 369/7 |
| 6,314,094 B1 | 11/2001 | Boys | |
| 6,339,706 B1 | 1/2002 | Tillgren et al. | |
| 6,396,769 B1 | 5/2002 | Polany | 367/131 |
| 6,401,085 B1 | 6/2002 | Gershman et al. | |
| 6,407,750 B1 | 6/2002 | Gioscia et al. | |
| 6,418,138 B1 | 7/2002 | Cerf et al. | |
| 6,420,975 B1 * | 7/2002 | DeLine et al. | 340/815.4 |
| 6,496,205 B1 | 12/2002 | White et al. | |
| 6,496,692 B1 | 12/2002 | Shanahan | 455/418 |
| 6,509,716 B2 | 1/2003 | Yi | |
| 6,510,210 B1 | 1/2003 | Baughan | 455/418 |
| 6,516,466 B1 | 2/2003 | Jackson | |
| 6,526,335 B1 | 2/2003 | Treyz et al. | |
| 6,587,835 B1 | 7/2003 | Treyz et al. | 705/14 |
| 6,591,085 B1 * | 7/2003 | Grady | 455/42 |
| 6,671,715 B1 | 12/2003 | Langseth et al. | |
| 6,694,200 B1 * | 2/2004 | Naim | 700/94 |
| 6,721,710 B1 | 4/2004 | Lueck et al. | |
| 6,741,980 B1 | 5/2004 | Langseth et al. | |
| 6,772,212 B1 * | 8/2004 | Lau et al. | 709/228 |
| 6,788,528 B2 * | 9/2004 | Enners et al. | 361/683 |
| 6,792,263 B1 * | 9/2004 | Kite | 455/412.1 |
| 6,792,615 B1 | 9/2004 | Rowe et al. | |
| 6,907,112 B1 | 6/2005 | Guedalia et al. | |
| 6,915,272 B1 | 7/2005 | Zilliacus et al. | |
| 6,956,833 B1 | 10/2005 | Yukie et al. | |
| 6,975,835 B1 | 12/2005 | Lake et al. | |
| 7,065,342 B1 * | 6/2006 | Rolf | 455/412.1 |
| 2002/0023028 A1 * | 2/2002 | Quarendon et al. | 705/26 |
| 2002/0046084 A1 | 4/2002 | Steele et al. | |
| 2003/0008646 A1 | 1/2003 | Shanahan | 455/418 |
| 2004/0078274 A1 | 4/2004 | Aarnio | |
| 2005/0010633 A1 | 1/2005 | Shanahan | 455/418 |
| 2005/0049002 A1 * | 3/2005 | White et al. | 455/556.1 |
| 2005/0054379 A1 | 3/2005 | Cao et al. | |
| 2005/0096018 A1 * | 5/2005 | White et al. | 455/414.1 |

OTHER PUBLICATIONS

U.S. Appl. No. 60/167,179, filed Nov. 23, 1999.
U.S. Appl. No. 09/234,259, filed Jan. 20, 1999.

* cited by examiner

SYSTEM AND METHOD FOR CONNECTING A PORTABLE AUDIO PLAYER TO AN AUTOMOBILE SOUND SYSTEM

RELATED APPLICATIONS

This is a continuation application of U.S. patent application Ser. No. 09/537,812 filed on Mar. 28, 2000, now U.S. Pat. No. 7,187,947, Issued Mar. 6, 2007, the entirety of which is incorporated herein by reference in its entirety.

FIELD OF THE DISCLOSURE

The present invention relates to an audio system and method.

BACKGROUND

The first commercial radio stations in the United States began operation around 1920. Today, there may be as many as 12,000 radio stations in the United States programming in several distinct formats. When broadcasting their respective signals, these radio stations often use an analog signal, which may be modulated based on frequency or amplitude. Frequency modulated (FM) radio appears to be the dominant entertainment medium while amplitude modulated (AM) radio seems to be a popular outlet for news and information.

Unfortunately, analog radio may be unable to provide the sound quality and consistency that radio listeners desire. As such, several broadcasting related companies have begun to consider a movement to digital radio. Unlike analog radio reception, digital radio reception may be able to provide compact disk (CD) quality sound while remaining virtually immune to interference. Being immune to interference may result in reducing static growls or "multipath" echoes, echoes caused by signal reflections off buildings or topographical features.

Some countries, like Canada and many European countries, may choose to have digital radio operate in a single digital radio band such as the L-band between 1452-1492 megahertz (MHz). This band would allow the reception of both terrestrially and satellite-originated signals. By comparison, FM radio typically operates between 88 and 108 MHz while AM radio typically operates between 0.525 and 1.705 MHz. Neither of these bands allows for easy transmission via satellite.

Canada proposed using the L-Band for digital radio as early as 1992. Several countries throughout the world have since agreed to use the L-Band for digital radio with one notable exception. It appears the United States has chosen not to operate its digital radio within the L-Band. In the United States, the L-Band may already be committed for military uses. Apparently, the United States plans to adopt a system called in-band on-channel, or IBOC, which fits within the AM and FM frequencies.

IBOC technology may offer some advantages over L-Band transmissions. For example, there may be no need for new spectrum allocations. There may be backward and forward compatibility with existing AM and FM systems on both the transmitter and receiver sides, and there may be a low-investment upgrade to digital systems. Unfortunately, a workable IBOC solution is yet to be seen though technology may someday make IBOC digital radio commercially possible.

Even if an IBOC solution becomes commercially available in the United States, IBOC digital radio may suffer from several shortcomings. For example, there may global standardization problems. Though the United States favors IBOC, the European and Canadian communities seem to favor L-Band making the establishment of a global standard difficult.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE DRAWINGS

The conceptual groundwork for the present invention includes wirelessly communicating selective information to an electronic device. According to one aspect, a user may interact with the Internet to select information, such as audio information, and wirelessly communicate the selected information to an electronic device. The electronic device receives the information via a wireless communications network and processes the information accordingly. In a particularized form, a user may select information from an Internet website operable to allow selectivity of audio information such as songs, on-line radio stations, on-line broadcasts, streaming audio, or other selectable information. Upon selecting the audio information, information or data associated with the selected audio information is wirelessly communicated to an electronic device. The electronic device may then be used to process the selected audio information. In this manner, a user may receive selective audio information via a wireless electronic device.

In one form, the electronic device may be operable to communicate with an individual's automobile audio system. A user may select audio information utilizing a personal computer with access to a website operable to display selectable audio Information. The selected audio information may then be wirelessly communicated to the electronic device associated with an automobile's audio system. Therefore, upon receiving the selected audio information, a user may access and play the received audio information utilizing the electronic device in association with the automobile's audio system.

The present invention is not limited to communicating only audio information. One skilled in the art can appreciate that other types of information, such as video, textual, etc. may be communicated utilizing the systems and methods disclosed herein without departing from the spirit and scope of the present invention. Additionally, it will be understood that information may be formatted in a plurality of ways at different phases of communication without loosing the underlying content of the selected information. For example, an audio file may be formatted, segmented, compressed, modified, etc. for the purpose of providing or communicating the audio invention. Therefore, the term "audio information" or "information" is used in a general sense to relate to audio information in all phases of communication.

Figure 1:
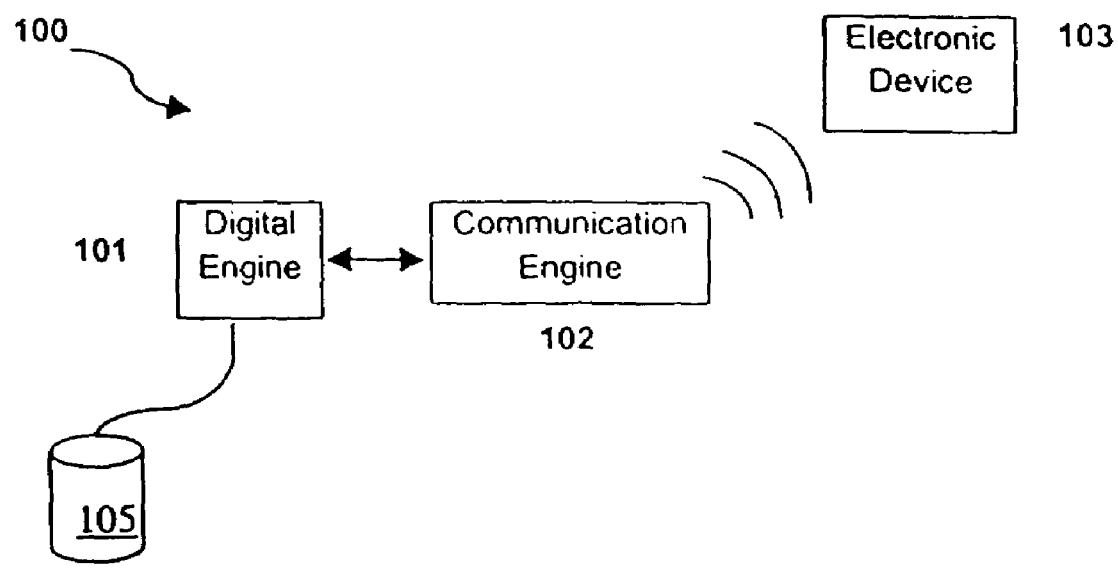
FIG. 1 depicts a general system for wirelessly communicating selective information to an electronic device in accordance with one aspect of the present invention.

FIG. 1 depicts a general system for wirelessly communicating selective information to an electronic device in accordance with one aspect of the present invention. The system, illustrated generally at 100, includes a digital engine 101 coupled to a communications engine 102. Communications engine 102 is remotely coupled to an electronic device 103. Digital engine 101 may be directly or indirectly coupled to storage device 105 operable to store information. Digital engine 101 maintains information or data associated with selected information in a digital format. The information may be stored within storage device 105 or other storage devices operable to maintain data or information associated with the selected information.

Communications engine 102 is communicatively coupled to digital engine 101 and operable to wirelessly communicate the selected information to electronic device 103. During operation, audio information may be selected by a user utilizing a personal computer or other devices operable to communicate with an information network. Digital engine 101 is operable to maintain information associated with the selected audio Information, For example, the information could be several songs or titles configured as an audio file and formatted in a digital format such as an MP3 file, wave file, etc. The maintained information may also be a reference to a network location when an audio file may be stored, a network location where a network broadcast of audio information may be located, etc. or other network locations having information associated wit the selected audio information. Therefore, digital engine 101 may maintain a plurality of different types of information or data associated with the selected audio information.

System 100, utilizing communication engine 102, may wirelessly communicate data or information associated with the selected audio information to electronic device 103 thereby providing wireless communication of selected information to an electronic device 103 operable to receive wireless communications. In one embodiment digital engine 101 may be used in association with an Internet website configured to provide access to selectable information. The Internet website operably associated with digital engine 101 allows a user to select information to be wirelessly communicated to electronic device 103 utilizing a network environment. The Internet website may include several different types of information related to audio information.

Figure 4:
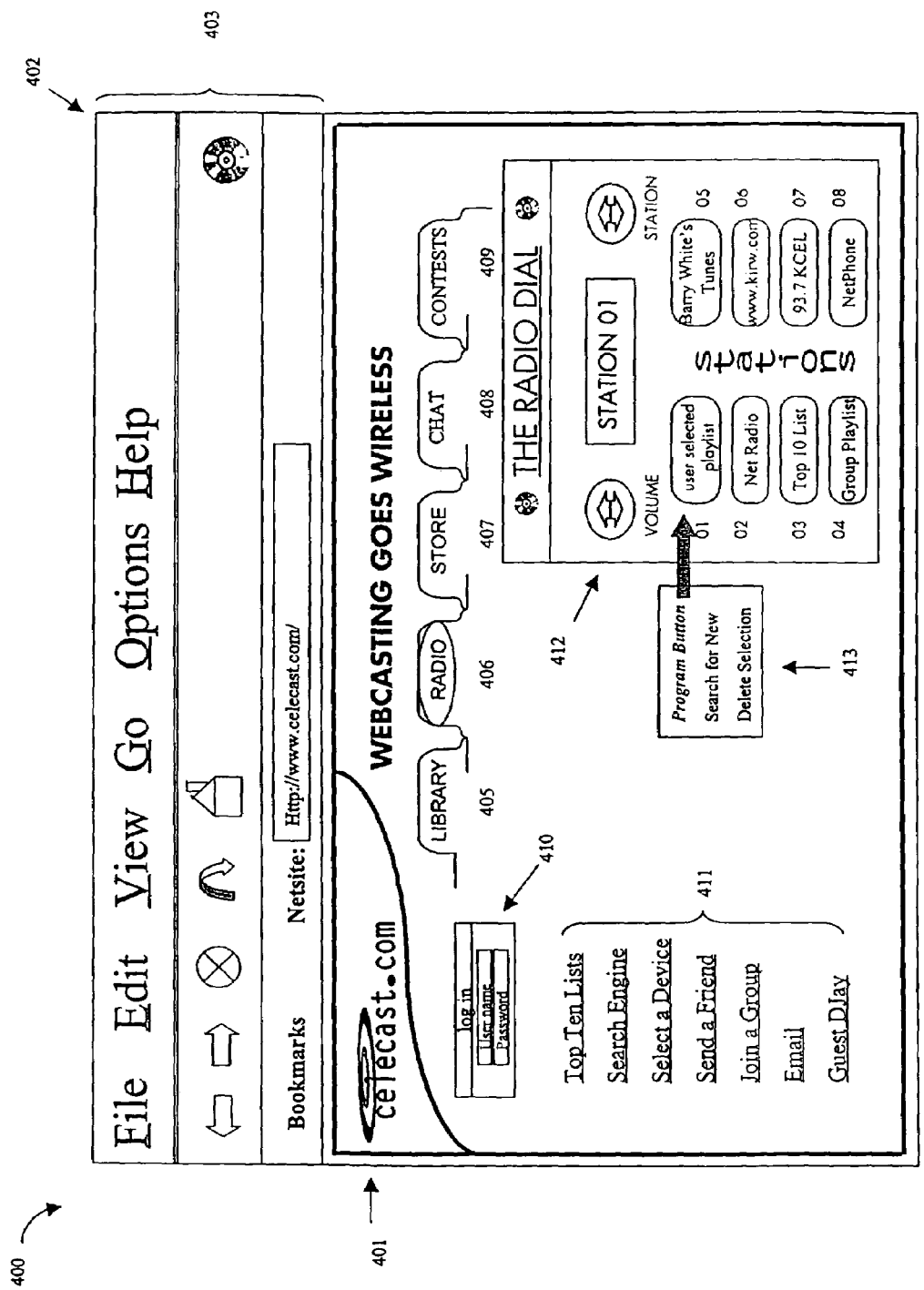
FIG. 4 illustrates a graphical user interface (GUI) for displaying selectable audio information according to one aspect of the present invention.

FIG. 4, described in greater detail below, illustrates one embodiment of providing an Internet website for displaying selectable audio information. For example, the Internet website may include music and/or artist search engines, playlists, top 10 charts, artists by genre, and other information associated with audio information. A user may select information associated with the audio information and digital engine 101 can maintain the information or data associated with the selected information in a digital format. Communications engine 102 coupled to digital engine 101 may wirelessly communicate data associated with the selected audio information to electronic device 103. Therefore, a user may access and select audio information via an Internet website and wirelessly communicate the data to an electronic device. As such, system 100 advantageously allows for wireless communication of selected audio information to electronic devices that may be remotely located from a conventional terrestrial communication network.

Electronic device 105 may be configured in a plurality of ways for receiving wireless communication of selected audio information. In one embodiment, electronic device 105 may be operable as a component configured to receive a cellular signal comprising the selected information communicated by the communication engine. For example, a device having a cellular modem may be operable to receive the information at specified intervals. Upon receiving the information the electronic device may process the received information. Electronic devices are described in more detail below and may include a network radio, a modular device, an audio system, a personal digital assistant (PDA), a cellular phone, or other electronic devices operable to receive information wirelessly communicated by communication engine 102.

Communications engine 102 may be operable to wirelessly communicate selected information to electronic device 103 in a plurality of ways. The present invention advantageously allows for several different embodiments of wirelessly communicating selected audio information to electronic device 103 and is not limited to any specific configuration described below. Several different types or combinations of wireless communication may be realized by the present invention. Communications engine 102 may be operable to wirelessly communicate the selected information from an information network, such as the Internet, to an electronic device operable to receive wireless communications. In one embodiment, communications engine 102 may comprise a conduit to interface information with a wireless communication network. The conduit may configure the information located within the information network into a format operable to be transmitted via wireless communication.

For example, a wireless device may be operable to receive packets of information having a specific size and in a specific format. In such an embodiment, communications engine 102 could format the information into a desirable format for wirelessly communicating the information to electronic device 103. Several types of wireless communication may be used by communications engine 102 to communicate the selected information to an electronic device. Communications networks such as GSM, Digital Satellite communication, SB, Radio bands, DRC, Super-DRC or other systems or types of transmission such as TDMA, CDMA, spread spectrum, etc. or frequencies such as between about 1.7 GHz and 2.0 GHz may be realized by the present invention for communicating information or data representing the selected audio information to electronic device 103.

In one embodiment, the selective information may be communicated using a digital broadcast signal. Digital broadcast includes providing information via a signal such as AM, FM, and the like. Digital information may be included or encoded as a sub-carrier within the broadcast signal and received by electronic device 103. A digital sub-carrier may include a selective bandwidth of frequencies for a specific radio station (i.e., 6 MHz for FM). The selective information may be wirelessly communicated to electronic device 103 utilizing a communication engine 102 operable to communicate the selective information via a digital FM signal. In this manner, selective information may be communicated within digital FM sub-carriers to an electronic device operable to receive the information. For example, a user may subscribe to communicate the information via an FM sub-carrier and receive the selective data through wireless communication via a specified FM sub-carrier.

In one embodiment, the selected information may be formatted and transmitted to achieve a desirable transmission rate. For example, conventional systems may transmit information at a speed of 10 kilobits per second. Therefore, for 1 megabyte of information to be communicated to an electronic device, a transmission time of approximately 800 seconds may be required. The present invention may allow for a relative increase in transmission speed by removing the requirement that information be communicated asynchronously to an electronic device. For example, conventional wireless communication utilizes a specified frequency to communicate information in two directions (i.e., cellular phones). As such, information is communicated across a channel in an asynchronous manner to provide a continuous audio signal to the recipient.

The present invention advantageously allows for signals to be transmitted to an electronic device in a less than asynchronous manner. For example, if a user selected a song to be wirelessly communicated to an electronic device, system 100 could communicate the information in a less than asynchronous manner allowing the selected information to be transmitted efficiently thereby decreasing the overall download time for the selected audio information. In one embodiment, the selected information may be compressed and transmitted across the same frequency but at different phases thereby allowing plural signals having different phases to be wirelessly communicated to an electronic device. Therefore, the electronic device may be operable to receive multiple phased signals and process the selective information accordingly.

In one embodiment, the information may be wirelessly communicated at a relatively slow transmission rate. For example, a user may schedule when the selected audio information may be used by electronic device 103. The user may select several different audio tracks or songs to be transmitted to an electronic device associated with the user's vehicle such that the user can listen to the user selected audio information during the drive home at the end of a workday. Therefore, it may be desirable to utilize a slower transfer speed due to the extended amount of time available prior to actual use of the selected audio information. In this manner, communications networks having less or slower transfer rates may be used to wirelessly communicate the selected audio information to the electronic device.

In another embodiment, high-speed wireless communication networks may be used to communicate the selected audio information. For example, a user may want to listen to an Internet broadcast of an Internet radio station. Therefore, high-speed communication may be required to wirelessly communicate or stream the selected audio information to an electronic device. In another embodiment, a hybrid of wireless communication rates may be deployed depending on the requirements of the selected audio information and/or the electronic device. For example, the selected audio information may first be transmitted to the electronic device via high-speed communication until enough information has been wirelessly communicated and buffered into a memory device operably associated with the electronic device. Upon communication of a certain percentage of the selected audio information, slower communication speeds may then be used to communicate additional selected audio information.

Therefore, system 100 may be configured in a plurality of ways to communicate selected information to electronic device 103. Digital engine 101 may be used to maintain data or information associated with the selected information and communication engine 102, communicatively coupled to digital engine 101, may wirelessly communicate selected information to electronic device 103.

Figure 2:
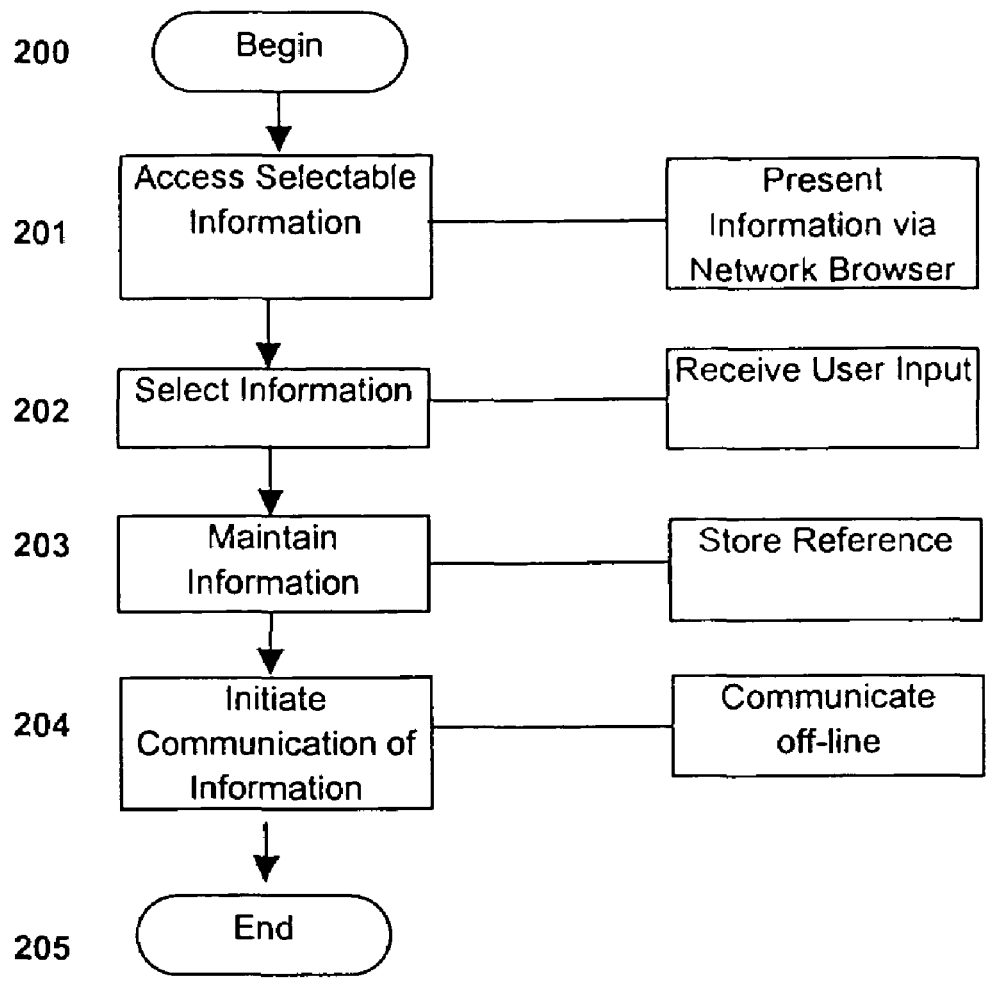
FIG. 2 illustrates a block diagram of a method of wirelessly communicating selected information to an electronic device.

FIG. 2 illustrates a block diagram of a method of wirelessly communicating selected information to an electronic device. The method may be used in association with the system illustrated in FIG. 1 or other systems operable to utilize the method of FIG. 2.

The method begins generally at step 200. At step 201, selectable audio information may be accessed utilizing a network communications device. For example, selectable audio information may be displayed at an Internet website accessible by a personal computer. In another embodiment, the selectable information may be accessed utilizing a wireless communications device such as, a cellular phone, a PDA device, or other devices operable to provide access to the selectable audio information.

Upon accessing the selectable information, the method proceeds to step 202 where a user can identify or select audio information to be wirelessly communicated to an electronic device. For example, a user may select an entire album to be wirelessly communicated to a PDA device.

Upon the user selecting the audio information, the method proceeds to step 203 where the method maintains information associated with the selected information. In one embodiment, the information may be an audio file, such as a wave file, and MP3 file, etc. representative of the selected audio information. In another embodiment, a network location that comprises a file representing the selected information may be maintained. Another example may include a network location of a network broadcast of audio information. Therefore, the method at step 203 may maintain several different types of information associated with the selected audio information.

Upon maintaining information or data associated with the selected information, the method proceeds to step 204 where the method wirelessly communicates information associated with the selected information to an electronic device. For example, if an audio file associated with the selected audio information was maintained, the method would communicate the audio file to the electronic device. In another embodiment, a link or network address broadcasting the selected audio information may be accessed and, at step 204, wirelessly communicated to an electronic device. In another embodiment, a combination of different types of audio information may be wirelessly communicated to an electronic device. Upon transmitting the selected audio information, the method proceeds to step 205 where the method ends.

Selected audio information may be communicated in a plurality of ways as described above including communicating via a cellular communications network to an electronic device operable to receive cellularly-communicated signals. For example, the information may be selected from a website operable to display selectable information. Upon selecting the audio information, a data file representing the selected audio information may be wirelessly communicated to an electronic device thereby allowing a user to select audio information via the Internet and wirelessly communicate the information to an electronic device.

In some embodiments, the wireless communication to an electronic device may occur in an off-line environment. For example, a user may go "on-line" to access a website and select information and then go "off-line" or end the browsing session. The wireless communication may then occur while the user is off-line thereby removing the confines of using an active or on-line browsing environment (i.e., Internet radio broadcast, streaming audio, etc.) for accessing selected information. Therefore, the method of FIG. 2 allows for information, such as audio information, to be communicated from a network location such as a web site, to an electronic device "via" wireless communication. The present invention advantageously allows users to access and download information accessible by a network location to an electronic device operable to receive wireless communications thereby reducing the need for land lines, terrestrial communication networks, etc. for communicating selective information.

In one embodiment, the method of FIG. 2 may be deployed in association with an Internet website operable to display selectable links for downloading information. The information may include audio information such as MP3s, streaming audio, streaming, internet broadcasts, etc. are selectable by a user and operable to be wireles sly communicated to an electronic device. By providing a user with a website of selectable audio information operable to be wireless communicated to an electronic device, a user may customize information communicated to an electronic device. In one embodiment, a user may communicate information to an electronic device that may not be owned by the user. For example the method of FIG. 2 could be modified to allow a user to wirelessly communicate audio information to a plurality of electronic devices that may or may not be owned by the user.

Figure 3:
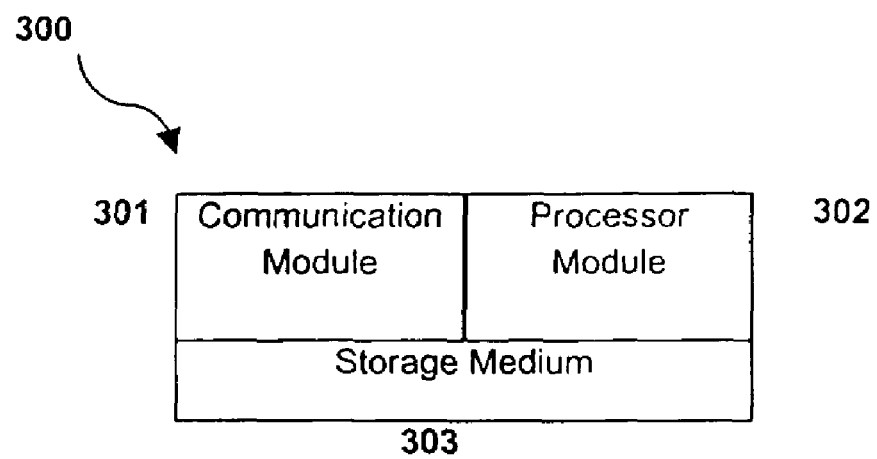
FIG. 3 illustrates an electronic device operable to receive selected audio information in accordance with the teachings of the present invention.

FIG. 3 illustrates an electronic device operable to receive selected audio information in accordance with the teachings of the present invention. Electronic device 300 includes a communication module 301 such as a transceiver coupled to storage medium 303 such as a high speed buffer, programmable memory, or other devices operable to store information. Electronic device 300 may also include processor 302 operably associated with communication module 301 and storage medium 303. Processor 302 may be operable to process wirelessly communicated selected information and in one embodiment may be integrated as part of communication module 301 of storage medium 303. In the same manner, as larger scale integration of electronic devices proliferate, communication module 301, processor 302, and storage medium 303 may be integrated into one communication component or device operable as electronic device 300.

Processor 302 may be operable using software that may be stored within storage medium 303. In one embodiment, software upgrades may be communicated to electronic device 300 via wireless communication allowing for efficient system upgrades for electronic device 300. Storage medium 303 may include one or several different types of storage devices. For example, storage medium 303 may include programmable gate arrays, ROM devices, RAM devices, EEPROMs, minidisks or other memory devices operable to store information.

During use, electronic device 300 receives wireless communications of selective information. The information may be transmitted via a wireless communications network and received by electronic device 300 via transceiver 301. Transceiver 301 may be operable to convert the received wireless communication signal into a desirable format and store the received information within storage medium 303. The received information may then be processed by electronic device 300.

In one embodiment, electronic device 300 may be operable as an audio player configured to play digital representations of music. For example, electronic device 300 may also include an MP3 player operable to process the received information into an audio signal. Therefore, electronic device 300 may be used to receive wirelessly communicated MP3 audio files and play these files using an MP3 player when desired. In another embodiment, electronic device 300 may be configured as a PDA wherein the PDA includes a web browser operable to wirelessly communicate with the Internet. The PDA device may include a user interface allowing a user to select information to be wirelessly communicated to electronic device 300.

By providing a website of selectable information, the PDA devices may provide an efficient embodiment for electronic device 300 in that is allows a user to access and select information using a wireless communication network and receive the selected information using the same or different wireless communication network. In yet another embodiment, electronic device 300 may be configured as a component operable to receive selective information via wireless communication and communicate the information to a second electronic device such as an automobile sound system, home stereo, etc.

For example, electronic device 300 may utilize transceiver 301 to receive wirelessly communicated information. Electronic device 300 may then be coupled to an automobile sound system using an interface and communicate the received information to the automobile sound system. In this manner, electronic device 300 may be used to provide the automobile sound system with audio files received via wireless communication.

In another embodiment, electronic device 300 may be operable to communicate the received audio information to an audio system via a localized communications-signaling network. One such network may include utilizing "Bluetooth" communication standard, used to provide communication between electronic devices in a proximal setting. In one embodiment, electronic device 300 may be integrated into an audio component such as a radio receiver. Electronic device 300 integrated into an audio component may be configured to process digital audio files wirelessly communicated to an audio component. In another embodiment, electronic device 300 may be operable to communicate with an analog receiver at a predetermined frequency.

For example, a specific frequency may be selected (i.e., 93.7 MHz) for communicating the wireless received selected information from electronic device 300 to a localized audio system. Electronic device 300 communication of the wirelessly received information allows a conventional receiver to receive the selected audio information. In one embodiment, the conventional receiver may be configured to receive a digital sub-carrier, on-carrier, or other within a specified frequency. Therefore, electronic device 300 may be operable to locally transmit the signal at a specific frequency thereby allowing the conventional receiver to receive the information. In another embodiment electronic device 300 may be operable to scan plural bandwidths to receive the selective information. For example, transceiver 301 may be operable to receive selective information across several frequencies and process the received information accordingly.

In another embodiment, electronic device 300 may be operable to scan several frequencies to obtain the desirable information. For example, a user may select several Internet broadcasts comprised of streaming audio information. Therefore, the information may be transmitted across several wireless frequencies receivable by electronic device 300. Electronic device 300 may then be operable to allow a user to scan wirelessly communicated Internet broadcast signals thereby providing a user selected virtual broadcast radio network. In another embodiment, electronic device 300 may include a user interface operable to communicate with an Internet website operable to display selectable audio information. The Internet website may be configured as a user-preferred environment displaying a users selected audio information. Internet broadcast selections, streaming audio selections, etc.

With a display device for displaying a Website having selectable information, electronic device 300 may allow a user to select audio information via a user interface and receive the selected information via wireless communication thereby providing a customizable WebRadio device for the user. In another embodiment, electronic device 300 may be a modular device configured to be coupled to, for example, a portion of a cars interior. For example, electronic device 300 may be mounted to a portion of a car's console thereby providing a removably coupled electronic device operable to wirelessly receive selected audio information. As a removable device, electronic device 300 may also be coupled to a home audio system, a portable radio system or other systems thereby providing a versatile electronic device operable to receive wirelessly communicated selected audio information.

In another embodiment, electronic device 300 may be operable as a PDA and/or a cellular phone that may be mounted to an automobile's console. Electronic device 300 may then integrate with a user's automobile to provide an all-encompassing communications device. For example, electronic device 300 configured as a PDA and cellular phone may allow for communication with a user's email account, voice mail account, the Internet, as well as allowing for the receipt of selected audio information via wireless communication. Electronic device 300 may be operable in a hands-free mode allowing a user to maintain safe driving fundamentals. During use, electronic device 300 may be processing selective audio information for communicating with an automobile audio system and may further be operating to receive incoming cellular calls.

Electronic device 300 may be set-up by the user to pause the music being played and allow the received cellular call to be communicated either via an independent speaker or utilizing the automobiles "audio system." Additionally, electronic device 300 may be operable to adjust the listening level of an automobile's audio system, it may play received voice mail messages, allow a user to view the Internet, etc. In one embodiment, electronic device 300 may be operable as a dual mode electronic device capable of receiving both digital and analog wireless communication signals. In this manner, electronic devices may efficiently utilize available bandwidth for receiving selected information from a communications engine. For example, transceiver 301 may be a wireless communications modem operable to receive digital or analog signals.

FIG. 4 illustrates a graphical user interface (GUI) for displaying selectable audio information according to one aspect of the present invention. The GUI may be operable with a computer system, cellular device, PDA, or other electronic devices or systems operable to display the GUI of FIG. 4. The GUI, shown generally at 400, may be displayed using a conventional web browser 402 such as Microsoft® Internet Explorer, a WAP browser, or other browsers operable to display the audio information. Browser 402 includes browser functions, shown collectively at 403, for navigating a network such as the Internet or an intranet. Homepage 401 may be displayed using browser 402 and may include several functions, features, information, etc. related to audio information. Home page 401 may be developed using several different types of programming (i.e., HTML, XML, Java, etc.) used to developing a network location or website.

The present invention is not limited to any one specific type of software and may be realized in plurality of ways as can be appreciated by those skilled in the art. Homepage 401 may also include login region 410 allowing a user to log into homepage 401 and display a user-preferred environment. For example, a user may want Radio Dial 412 to appear when a user logs into homepage 401. In another embodiment, a user may want to view a current playlist selected by the user or the status of wirelessly communicated playlist. A user may also provide demographic information allowing advertisers to access the demographic information and provide advertisements based upon the demographic information. For example, an advertiser may want to target Hispanic females in the 21-25 year old age group.

Through providing demographic information to advertisers, when a user logs into homepage 401 selective advertising can be "targeted" for a group of users. Homepage 401 may also include several tabs for efficiently navigating homepage 401. Library tab 405 may be provided to allow a user to browse available audio information that may be presented by title, genre, artist, decade, culture, etc. Store tab 407 may also be provided for locating items available for purchase such as CDs, PDA devices, MP3 players, wireless communication hardware, interfaces, software or other types of products that may be purchased while on-line. Chat tab 408 may also be provided allowing a user to chat with other users of home page 401. For example, a guest musical artist may be available to chat with visitors of home page 401 via a chat page associated with chat tab 408. Home page 401 may also include contest tab 409 for displaying current contests, prizes, and/or winners.

Radio tab 406 may also be provided for displaying audio information, For example, radio tab 406 may display a collective menu 411 of selectable functions or features associated with audio information. Top ten lists may be provided to a user based on several different billboard polls or genres. A search engine may be provided allowing a user to search for a specific type of audio information such as an artist, song title, genre, and Internet radio stations, etc. In one embodiment, a user may input the lyrics to a song within the search engine. As such, the search engine may locate several different songs having the desirable lyrics and allow a user to select the search results. A user may also use a select a device feature that allows a user to select a destination device for communicating selected audio information. For example, a user may want to communicate a playlist to several different devices such as a PDA, a home computer system, a work computer system, etc.

As such, a user can communicate selective information to several devices without having to download the information separately for each device. A send a friend link may also be provided allowing a user to send selective audio information to a friend's electronic device. A user may also join a group comprised of individuals that select a certain genre of music to be communicated to the user's electronic device. For example, a user may want to join a group that plays only 50s swing music. As such, the user could communicate the group's selected songs to the user's electronic device. A user may also utilize an email account provided by homepage 401 allowing a user to correspond with others via email. A user may also access a list of guest DJs that may provide playlists of songs chosen by the guest DJ and selectable by a user.

In one embodiment, a user's radio dial 412 may be provided when a registered user logs into homepage 401. As such, radio dial 412 may include several functional buttons similar to conventional systems such as a volume control and a station control. However, radio dial 412 surpasses the limitations of conventional systems through providing a programmable radio dial of user customized audio information. Radio dial 412 includes several stations that may be programmed using program interface 413. The preset stations may include several different types of user customized preset information such as user selected playlists, Internet broadcast stations, top lists, group playlists, artist-selected lists, Internet radio station, conventional radio stations, Internet phone, cellular phone, etc. and other functions, features, or information associated with audio information.

Radio dial 412 may also be displayed as a separate user interface and in some embodiments, does not require a "browsing" environment to view radio dial 412. For example, an electronic device, such as a PDA, having a display may graphically present radio dial 412 to a user. One example may be using electronic device in association with an automobile audio system. Electronic device may display radio dial 412 and may allow a user to navigate, modify, select, adjust volume, access daytimer, access phone lists, etc. or perform oilier functions while the electronic device is used in association with an automobile sound system. Therefore, radio dial 412 may be operable as an application for use with several different types of electronic devices (i.e., computer systems, portable computing devices, cellular phones, etc.) operable to display radio dial 412 and in come embodiments may be wirelessly communicated to an electronic device.

In another embodiment, homepage 401 may allow a user to select when to download the information to an electronic device. For example, a user may want to listen to a certain genre of music at a specific time of day thereby allowing a user to select the information. As such, a user may select a different playlist for every day of the week thereby allowing a user to listen to different songs on different days of the week. The user can further identify when the selected playlist should be available for listening. For example, if a user wanted to listen to "playlist #1" on Monday morning during the drive into work between 8:00 am and 9:00 am, the user would enter the time and the day "playlist #1" would be available for listening. In this manner, the playlist may be communicated to the electronic device thereby allowing a user to listen to selective audio information at a desirable time.

Figure 5A:
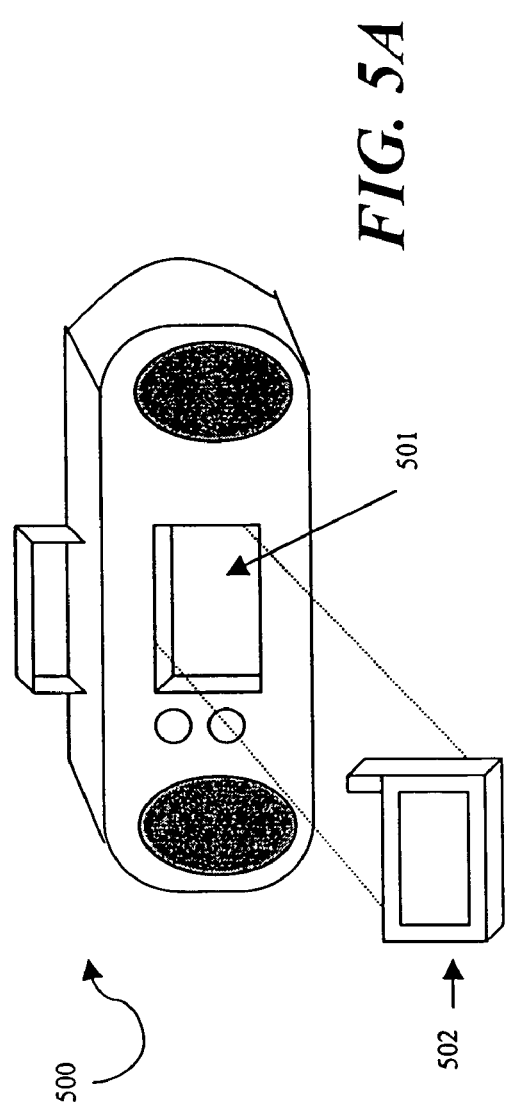
FIG. 5A illustrates a portable radio system having a mount for an electronic device according to one embodiment of the present invention.

FIG. 5A illustrates a portable radio system having a mount for an electronic device according to one embodiment of the present invention. Portable radio 500 includes a mount 501 operable to receive electronic device 502. Mount 501 may include a connector operable to provide communications and power to electronic device 502. During use, electronic device 502 when mounted within portable radio 500 communicates with portable radio to provide remotely received selective audio information. In one embodiment, electronic device 502 may include a user interface allowing a user to access the Internet. Therefore, selective audio information located on the Internet may be accessed by the user and remotely communicated to electronic device 502 coupled to portable radio 500.

In another embodiment, portable radio 500 may include memory operably located within for storing downloaded information. For example, portable radio 500 may include 32 MB of RAM allowing electronic device 502 to receive selective information and download the selective information to memory located within portable radio 500. In this manner, the downloaded music may be operable to be played within portable radio 500 while allowing electronic device to be removed from portable radio 500. Therefore, portable radio 500 including electronic device 502 allows a user to communicate selected audio information to portable radio 500.

Figure 5B:
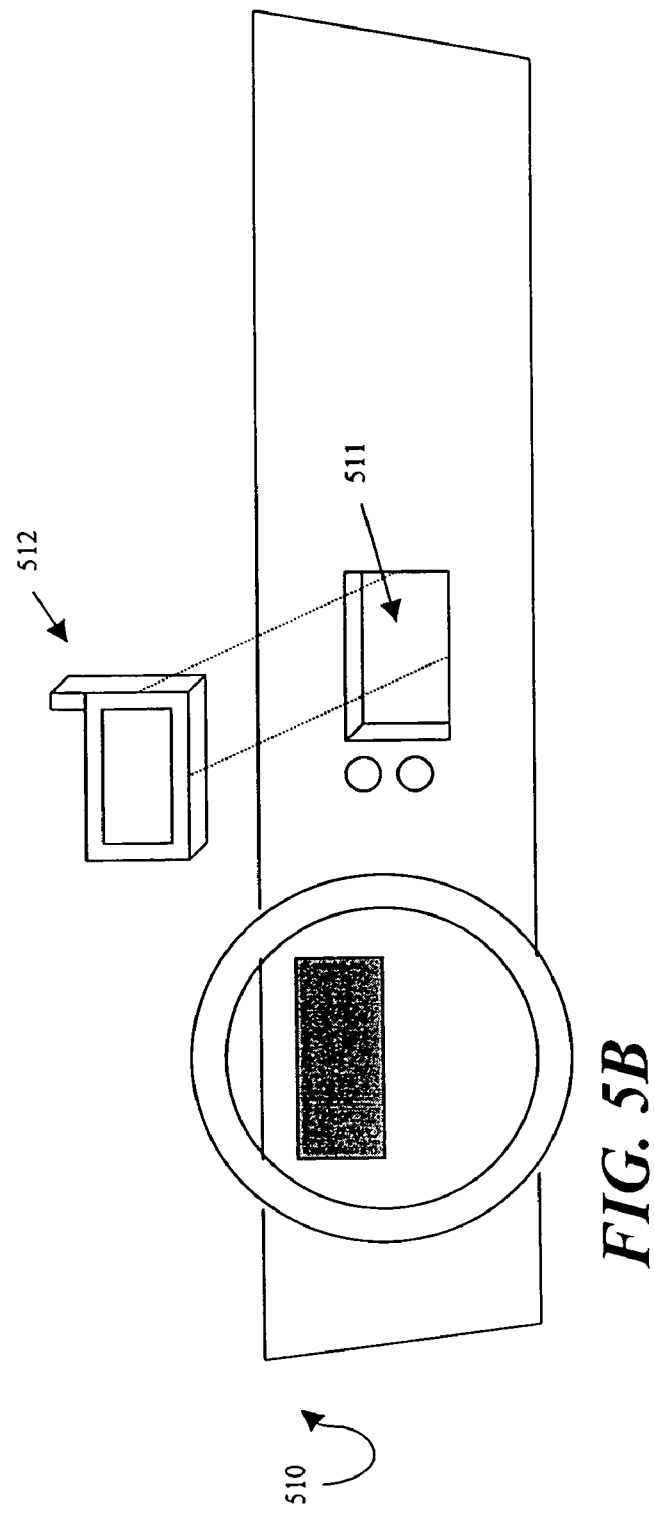
FIG. 5B illustrates an automobile console having a mount for coupling an electronic device according to one aspect of the present invention.

FIG. 5B illustrates automobile console having a mount for coupling an electronic device according to one aspect of the present invention. Console 510 includes mount 511 operable to receive electronic device 512. Mount 511 may be located in many different locations within an automobile such as coupled to a sun visor, center console, dashboard, floorboard, etc. Mount 511 allows the user to couple electronic device 512 to the automobile and provide an interface for communication between electronic device 512 and the automobile audio system. Mount 511 may also include a power connection that allows electronic device 512 to use the automobiles power during use. The power connection may also be used in association with a recharging circuit operable to recharge a power supply within the electronic device. During operation, electronic device 512 coupled to mount 511 may receive selected audio information via wireless communication and communicate the selective information to the automobile audio system.

In one embodiment the automobile may include memory operably associated with the automobile for storing information. The memory may be used in association with mount 511 and electronic device 512 to store the selected audio information. In this manner, voluminous audio information can be stored within the memory allowing electronic device 512 to receive additional information. In one embodiment, a mount may be provided for a home audio system (not shown) for downloading selected audio information for use with a home audio system. For example, a mount device may be coupled to a home stereo system such that upon placing an electronic device such as electronic device 500 within the mount, selected audio information may be communicated to the home audio system thereby allowing a home audio system to be used in association with an electronic device.

Figure 6:
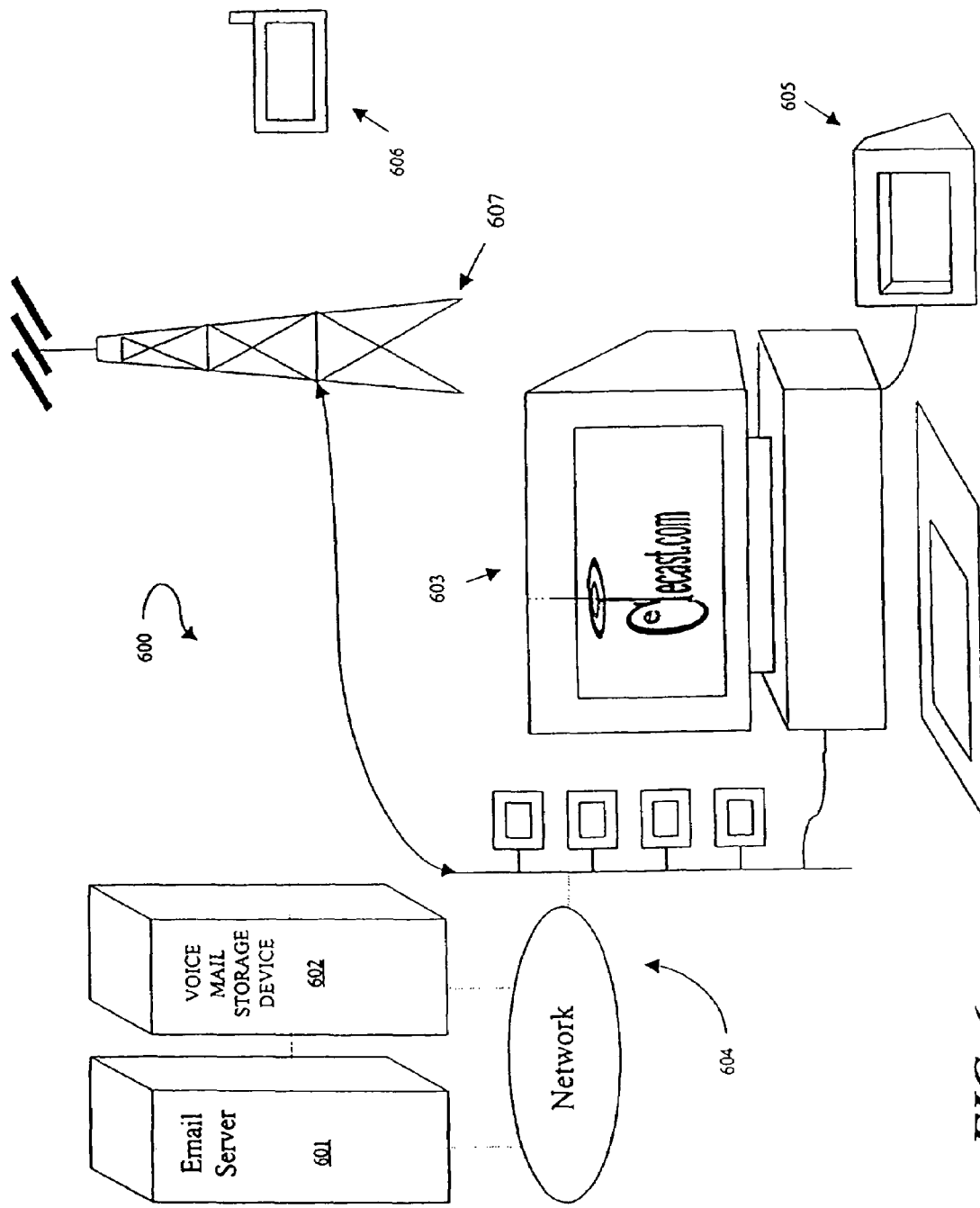
FIG. 6 illustrates a block diagram of a system for communicating voice mail messages using email according to one embodiment of the present invention.

FIG. 6 illustrates a block diagram of a system for communicating voice mail messages using email according to one embodiment of the present invention. The system, indicated generally at 600, includes email server 601 coupled to a voice mail storage device 602. System 600 further includes a computer system or network terminal 603 such as a computer coupled to network 604. System 600 further includes mount 605 for mounting electronic device 606 for hardwire communication of information. Device 606 may also communicate with network 604 using a wirelessly communication network operably associated with network 604 and coupled, for example, via tower 607.

During operation, system 600 communicates voice mail messages to a user utilizing email server 601. For example, if a user receives a voice mail message, email server 601 would be notified and a voice mail message would be sent to the user's email account in the form of an email message. For example, a voice mail message would be sent to a user's email account within intranet 604 in the form of an audio file as an attachment to the email. Upon receiving the email, a user may click on the audio file representing the voice mail message to hear the message left by a caller.

In one embodiment, a user may be accessing the Internet via a phone line and, as such, be unable to receive notification that a voice mail message has been received. System 600 would receive the voice mail message and send an email comprising the voice mail message to the user email account. In this manner, a user can remain connected to the network and receive voice mail without having to log off or disconnect from the Internet. In one embodiment, a user may receive the voice mail message via a portable electronic device. For example, a user may be using remote device 605 operable to receive wirelessly communicated information. System 600 would receive the voice mail message and forward the voice mail message to a user's portable electronic device 606. In this manner, a user may be capable of receiving voice emails at remote locations.

In another embodiment, a user may subscribe to use an Internet email account that may be operably associated with system 600. Utilizing an Internet email account may allow a user the flexibility to check voice email messages from any location in the world. For example, a user may access a "Hotmail" email account while traveling on business in a foreign country. The user, upon gaining access to the "Hotmail" account, would be able to listen to voice mail messages sent to the user via the "Hotmail" email account. Through utilizing an email account to receive voice mail messages, a user may be afforded great flexibility in communicating voice mail messages. For example, a user may be able to forward a voice mail message received in the form of an email to one or a plurality of other email accounts. In this manner, a voice email message may be sent efficiently to other email users.

For example, a user may maintain a distribution list of individuals working on a particular project that may have a need to hear certain voice email messages. In this manner, a user may efficiently disseminate information to other individuals while adding additional textual information to the body of the email allowing a user to comment on the original voice email message. In another embodiment, a user may forward a received voice email message to another account operable to receive forwarded voice email messages. For example, system 600 may be operable to receive an email message having a voice mail message as an attachment. The system would then be operable to forward the voice mail message to specified phone number, separate email account, and/or voice mail account, etc. thereby providing a user flexibility in receiving voice email.

In one embodiment, a user may utilize an email account to establish an answering service for voice mails. For example, a user's telephone number may be operable with an email account to provide an answering service. A user may record a message for a specified phone number or extension and, upon receiving an incoming call; the recorded message may be played back to incoming the call's initiator. System 600 would then forward the received voicemail message via an email account to the user. For example, a user may have an account set up at a residence for receiving voicemail messages via a user-defined email account. The user could then forward all received voice mails from the home account to an email account at a place of work. Therefore, the user may have complete access to received voicemail messages. In the same manner, a user could set up their work phone number to forward a voicemail message to the user's home email account thereby allowing a user to receive a voicemail at a home email account. Therefore, system 600 may be operable in a plurality of ways to provide email messages comprised of voicemail messages received via a voice mail or email account.

Figure 7:
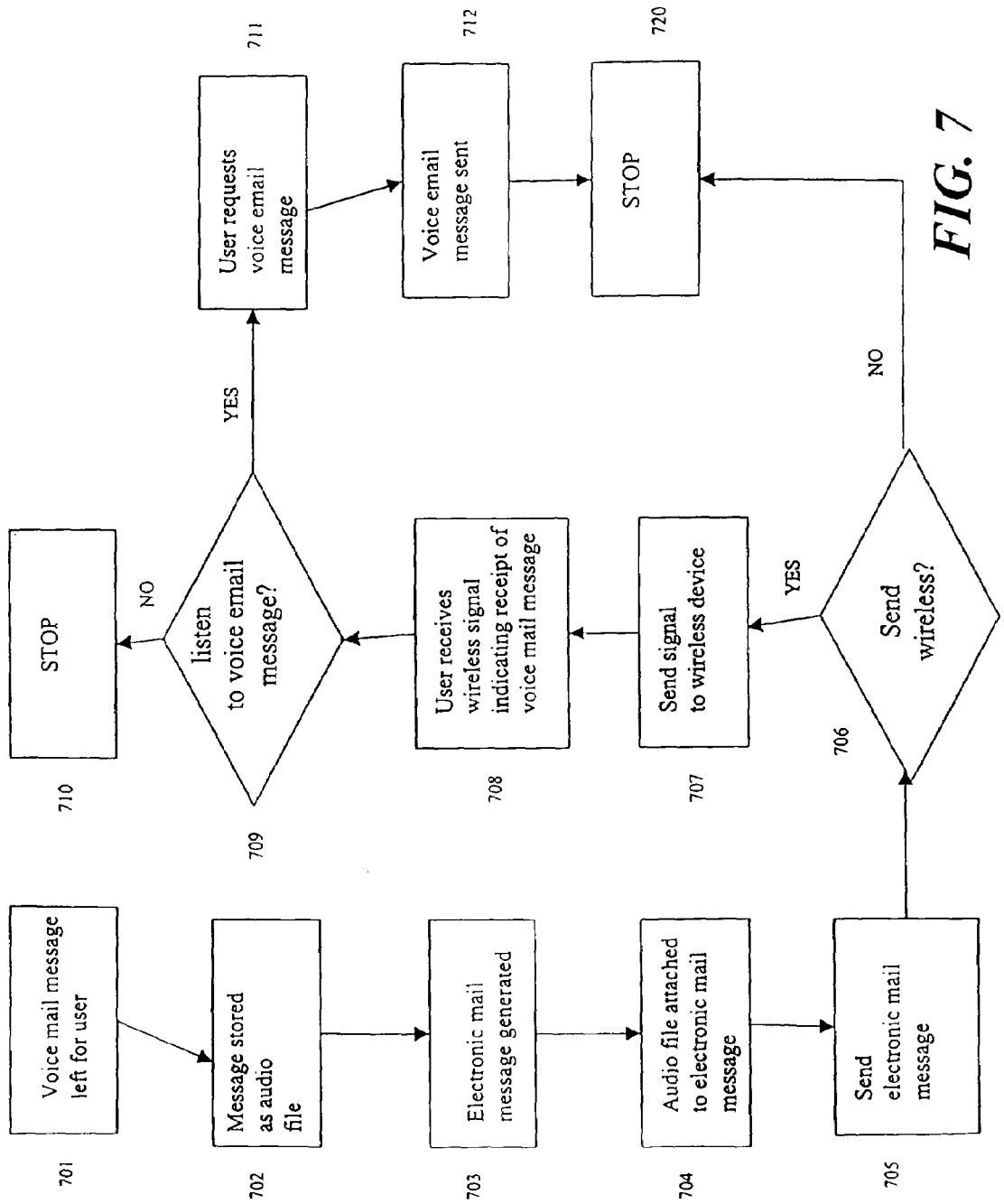
FIG. 7 illustrates a flow chart for providing voice email messages according to one embodiment of the present invention.

FIG. 7 illustrates a flow chart for providing voice email messages according to one embodiment of the present invention. The method begins at step 701 where a voice mail message is left for a user. The message could be at a residence, place of business, etc. The method then proceeds to step 702 where the message may be stored as an audio file within a database operable to store a file comprised of the voice mail message. Upon storing the file, the method proceeds to step 703 where an electronic mail message may be generated. The electronic mail message may be addressed to the recipient of the voice mail message. The method then proceeds to step 704 where the audio file representing the voice mail message is attached to the electronic message.

Upon attaching the audio file, the method then proceeds to step 705 where the email message may be sent to the email address. Upon sending the email message the method proceeds to step 706 where the method determines if the email message should be sent to a wireless electronic device. If the message is not to be sent to a wireless device, the method proceeds to step 720 where the method ends. If the message is to be sent to a wireless electronic device, the method proceeds to step 707 where a signal may be sent to the wireless electronic device and at step 708 an indication is provided to the electronic device indicating that a voicemail message has been received via a user's email account. The method may then proceed to step 709 where the user decides whether or not to listen to the voice email message. If the user decides not to listen to the voice email message, the method may proceed to step 710 where the method ends. If the user decides to listen to the voice email message, the method proceeds to step 711 where a request may be sent by the electronic device requesting the voice email message be forwarded to the user's electronic device.

At step 712, the voicemail message may be sent to the user's electronic device. Upon forwarding the voicemail message to the user the method may proceed to step 720 where the method ends. As such, FIG. 7 depicts one method of providing an email message comprised of a voice mail message. Certainly, other methods may be deployed as advancements in technology and are made without departing for the spirit and scope of the present invention.

Figure 8:
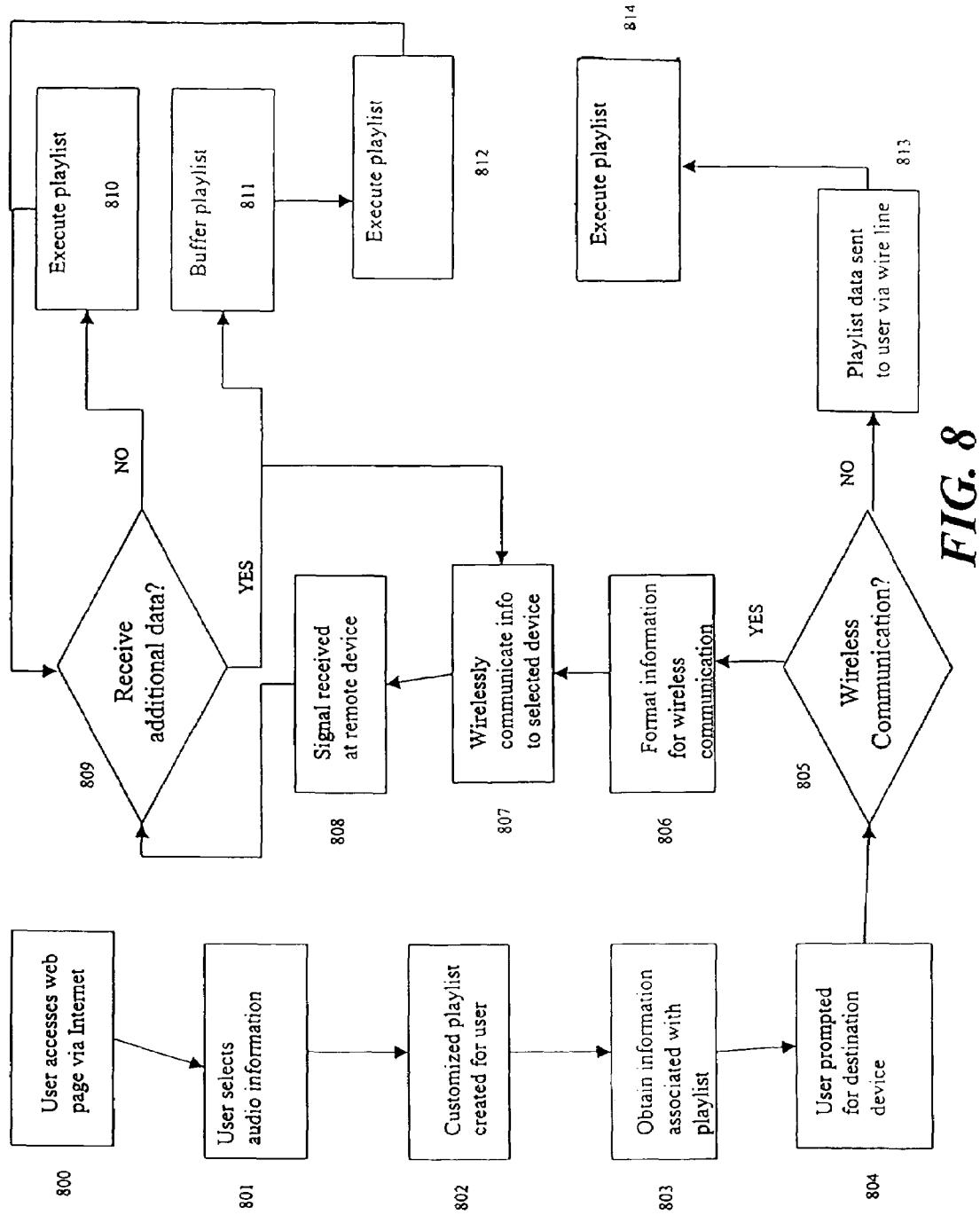
FIG. 8 illustrates a flow diagram of a method for providing selected audio information to an electronic device according to one embodiment of the present invention.

FIG. 8 illustrates a flow diagram of a method for providing selected audio information to an electronic device according to one embodiment of the present invention. The method begins at step 800 where a user accesses a webpage via the Internet. The webpage may be a home page illustrated in FIG. 4 or other web pages operable to display selectable references to audio information. The method proceeds to step 801 where a user selects desirable audio information. For example, a user may select a single song, a plurality different songs, an entire album, a broadcast station, streaming audio, etc. or other selectable audio information. Upon the user selecting a reference to audio information, the method may proceed to step 802 where a playlist may be created that represents the user's selected audio information.

The playlist may be variable in size and comprised of a plurality of different types of available audio information.

Upon creating a playlist, the method may proceed to step 803 where information associated with the playlist is obtained. For example, a list of network or URL locations comprised of the desirable audio information may be obtained. In this manner, desirable audio information may be obtained from many different sources such as URLs, network addresses, hard drives, databases comprised of audio information, etc. The sources may be accessed to obtain the selected audio information.

Upon obtaining data associated with the customized playlist, the method may proceed to step 804 where the user is prompted for a destination for the playlist. For example, a user may want to communicate the selected audio information to a remote electronic device, an automobile audio system, a home stereo system, a home computer, an electronic device coupled to a home network or computer system, etc. or other locations or devices operable to receive the selected audio information. In one embodiment, a user may select a device owned by a friend to accept the selected audio information. For example, a husband may want to send a romantic playlist to his wife on their anniversary. In this situation, the husband would select his wife's electronic device as the receiving device for the selected audio information.

Upon selecting a device, the method proceeds to step 805 where the method determines the destination of the selected audio information. If the information is to be sent to a device via a wire line connection, the method proceeds to step 813 where playlist data is sent to a user via a wire line connection. The method may then proceed to step 814 where the playlist is executed at the device. If the information is to be sent to a device requiring wireless communication, the method proceeds to step 806 where the information is formatted for communicating the information to a wireless electronic device. For example, a wireless PDA device may be selected as a destination device for the selected audio information. The PDA device may include an audio player, such as an MP3 player operable to play or execute MP3 audio files. In such an embodiment, the method could format the information such that the information may be wirelessly communicated and subsequently played by the MP3 player.

Upon formatting the information, the method may then proceed to step 807 where the audio information is wirelessly communicated to the selected device. In some embodiments, the device may be operable to receive a limited amount of information based upon storage capacity of the device (i.e., 16 MB). In such a case, the method may divide the information into component parts and periodically communicate the component parts, such as packets, to the electronic device. Upon communicating the audio information, the method may then proceed to step 808 where the signal may be received by the destination or electronic device.

The method may then proceed to step 809 where the method determines if all of the audio information has been received. For example, if 16 MB or 32 MB of selected audio information was initially transmitted due to capacity limitations of the selected device, the method may query the selected device to determine if capacity is available. If available memory exists, the method may proceed to step 807 where the method may communicate additional audio information based upon the amount of available memory. The method repeats until all of the selected audio information has been transmitted.

Upon communicating the selected information, the method may proceed to step 810 where the playlist may be executed. For example, a user may select a continuous communication of selected audio information (e.g., several hours of music, Internet broadcast, etc.). As such, the method may continuously play or execute the received audio information. In another embodiment, the method may proceed to step 811 where the method may store or buffer the received information until it is desirable to execute the received selected audio information at step 812. As such, upon executing the selected audio information, the method may proceed to step 809 where the method may repeat. In one embodiment, a user may elect to download a broadcast of an on-line radio station. For example, a user may want to listen to a radio station located in a remote location wherein conventional radio receivers could not receive the desired broadcast. For example, a person living in Houston, Tex. may not be able to receive a radio broadcast signal from a radio station in Seattle, Wash. utilizing a conventional radio receiver.

In accordance with the teachings of the present invention, a user may select an on-line broadcast or radio station as all or a part of the selected audio information. The user may then receive radio broadcasts without having to use a home computer system or conventional radio receiver.

At step 804, a user may select a device that does not require remote communication of information. For example, a user may elect to communicate the selected audio information to device, such as a personal computer, PDA device, MP3 player, etc. coupled via a network connection to the Internet or an Intranet. The user may receive the selected playlist at the determined device for eventual playing. In one embodiment, a user may select a plurality of devices as destination devices for receiving downloads of the selected audio information. For example, the user may want to download the information to a home stereo system, a PDA device, and an automobile stereo. As such, the selected information may be communicated to more than one destination device. In addition, the format of the download may match or conform to the selected destination device(s).

The present invention may be configured in a plurality of ways to communicate desirable audio information to users by allowing users to select desirable audio information and transmitting the desirable audio information to a specified destination thereby allowing a user to receive on-demand customized audio information. Moreover, the download may occur in an off-line environment, allowing a user to enjoy the selected audio information accessed on-line without having to be on-line or utilizing a browsing environment. In one embodiment of the present invention, the method of FIG. 8 may be modified to allow a user to select a "user group" for receiving customized audio information. For example, a "user group" may include users that prefer contemporary jazz wherein a user may request a certain song. Therefore, a virtual request line may be designed for a specific genre of music allowing "members" to transmit audio information to the "group".

In another embodiment of the present invention, the method may be modified to allow a user to select a specific genre to be transmitted to the users device. For example, a user may elect to have random country and western music transmitted to a destination device. The user could efficiently create a radio station format and have the format received at a destination device.

In a further embodiment, a user may select a group of genres to be downloaded to a desirable device. As such, the method may be modified to allow a user to select several different genres to download random music within the specified genres. In another embodiment, a user may elect to download the same music as another individual. For example, a user may want to download the same music as their best friend. Therefore the user could elect to download the same music as their friend or group of friends. In another example, a user may want to listen to the same music that an artist listens to on a specific weekday of evening. For example, a user may want to listen to the same music that Barry White listens to on a Saturday night.

Therefore, the user may select "Barry White's" Saturday night playlist and receive the same playlist Barry White receives on Saturday night. In another embodiment, the method of FIG. 8 may be modified to allow a user to manipulate song post download. For example, a user may want to store, delete, replay, copy, forward, etc. received audio information. Therefore, the method of FIG. 4 may be modified such that a user can manipulate or process the received audio information in a plurality of ways. In one embodiment of the present invention, an on-line radio station may be provided. For example, the radio station may be created for transmitting audio or on-line broadcasts. The on-line broadcasters or hosts may create their own format for broadcast. For example, an on-line radio station may be provided that transmits only children's songs.

Prior to conception of the present invention, conventional radio stations were monetarily limited to be capable of transmitting music such as children's songs to conventional radio receivers. The present invention, by providing a medium for transmitting selectable audio information, enables the existence of on-line broadcasting with little or no overhead cost for a host. A user may select an on-line broadcast for on-line or off-line delivery. In another embodiment, on-line broadcast of audio information representing books or novels may be provided to individuals such as the visually impaired. For example, an on-line broadcast station may provide several hours of audio information broadcast representing books or novels to be broadcast with very little overhead.

Figure 9:
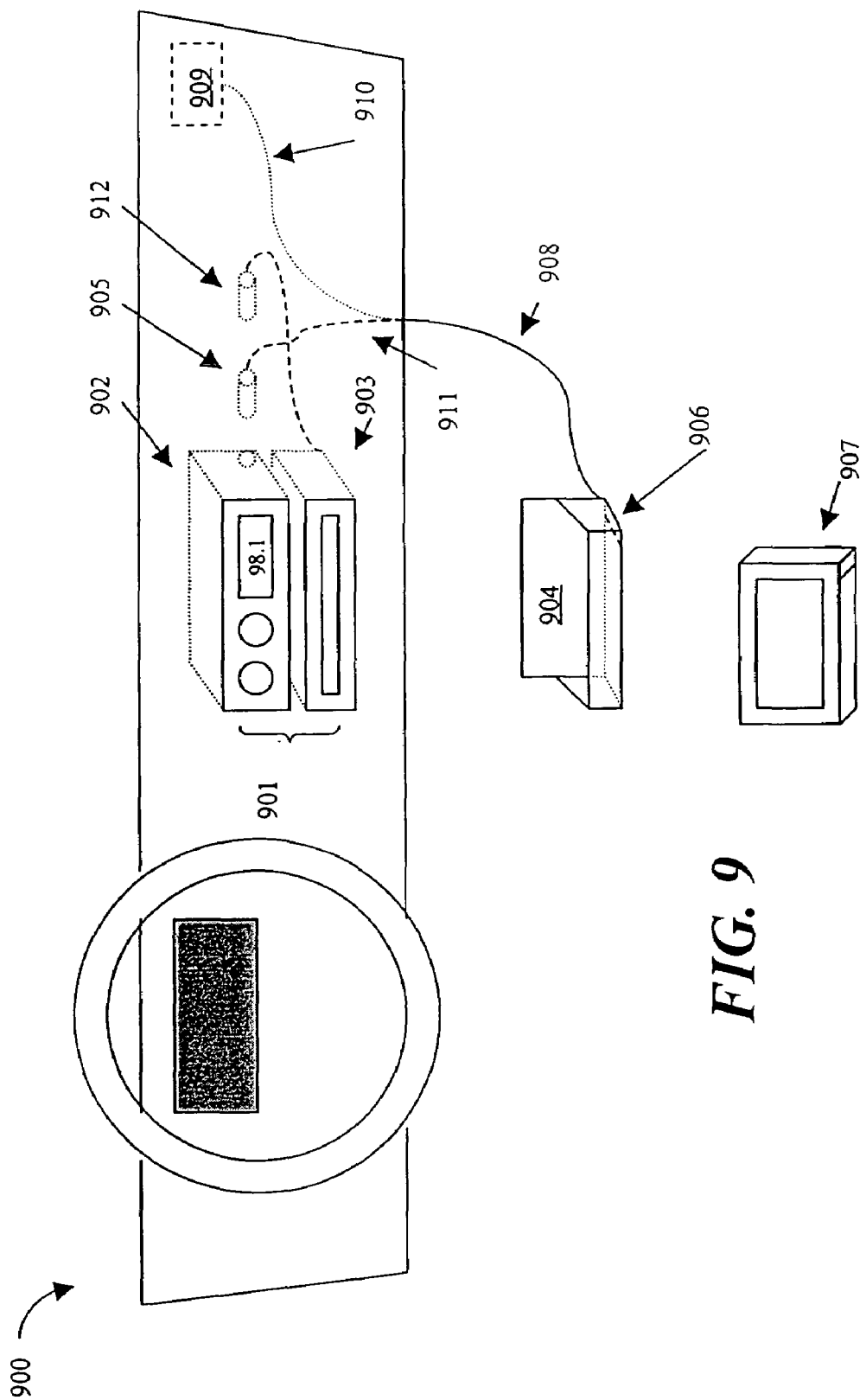
FIG. 9 illustrates an automobile console having a mount for an electronic device according to one embodiment of the present invention.

FIG. 9 illustrates an automobile console having a mount for an electronic device according to one embodiment of the present invention. Console 900 includes a conventional audio system 901 comprised of a receiver 902 and CD player 903. Interface 904 may be coupled to audio system 901 via plug 905 and cable 908, which may be coupled to an auxiliary line into audio system 901. Interface 904 may also include contact 906 for contacting electronic device 907. Cable 908 may be a multiple conductive cable for providing power from the automobiles power system via a protection circuit or fuse 909 for powering electronic device 907. In one embodiment, interface 904 may be operable to recharge electronic device 907 utilizing a power source associated with an automobile.

During operation, electronic device 907 may be mounted within interface 904. Electronic device 907 may also be powered or recharged via power line 910 and communicate with the systems audio system via interface cable or bus line 911. Audio information communicated to electronic device 907 may be transferred to audio system 901 such that a user may listen to selected audio information. For example, a user may have previously selected a plurality of audio files to be transmitted to electronic device 907. Electronic device 907 may communicate the selected audio information to the automobiles audio system that utilizes interface 901 thereby allowing the user to listen to selected audio information. In one embodiment, cable 908 may be custom-installed to audio system 901. For example, the cable may be coupled to an auxiliary line for the system's radio or may be coupled to CD player line 912.

In another embodiment, a radio manufacturer may provide interface 904 as a standard interface integrated into the audio system, thereby allowing communication between electronic device 907, audio system 901 and/or console 900. Electronic device 907 may include a plurality of different types of devices. For example, electronic device 907 may include a PDA device operable to store selected audio information. The information may be either remotely downloaded using an Internet web browser and wireless communication to the PDA device. In another embodiment, selected audio information may communicated to a PDA device via a hard wire coupled to a computer system interfacing with the Internet. In another embodiment, electronic device 907 may include an audio file player operable to play audio files such as MP3s, etc.

The audio files may be remotely or locally communicated to electronic device 907 and upon coupling to audio system 901, the audio files may be transmitted to audio system 901 in a form receivable by audio system 901. Although the disclosed embodiments have been described in detail, it should be understood that various changes, substitutions and alterations can be made to the embodiments without departing from their spirit and scope.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. An audio system, comprising:
    a portable electronic device having a display, a memory, and an audio file player;
    a first portion of software saved at the portable electronic device and configured to initiate a displaying of a graphical interface item on the display, the graphical interface item comprising a name associated with an audio file saved in the memory;
    a mounting location on the portable electronic device that includes a physical interface configured to communicatively couple the portable electronic device to a different electronic device having an associated display; and
    an other portion of software saved at the portable electronic device and configured to communicate a representation of the graphical interface item to the different electronic device via the physical interface to facilitate a displaying of the representation on the associated display, wherein the portable electronic device is configured to communicate interface information to the different electronic device in order to allow a user to view at least a partial representation of a graphical user interface that includes the graphical interface item on the associated display, wherein the graphical user interface comprises a plurality of preprogramed soft buttons that are linked to respective audio information sources.

2. The system of claim 1, wherein the other portion of software is further configured to communicate a collection of information to the different electronic device via the physical interface such that a user can utilize the different electronic device to navigate through a plurality of audio files.

3. The system of claim 1, wherein the different electronic device is an automobile sound system component.

4. The system of claim 1, wherein the portable electronic device is a cellular telephone.

5. The system of claim 1, further comprising an automobile having a sound system, wherein the different electronic device is a component of the automobile sound system.

6. The system of claim 1, further comprising a wireless communication device configured to engage the physical interface and to communicatively couple the portable electronic device to the different electronic device via a wireless signal.

7. The system of claim 6, wherein the wireless signal is communicated as a locally transmitted signal at a frequency between 88 and 108 MHz.

8. The system of claim 1, wherein the name is a playlist name.

9. The system of claim 1, wherein the name is a song title.

10. The system of claim 1, wherein the name is an artist name.

11. The system of claim 1, wherein the name is a user customized name identifying a playlist that comprises the audio file.

12. The system of claim 1, wherein the physical interface is further configured to couple the portable electronic device to the different electronic device such that a power supply of the different electronic device provides power to the portable electronic device.

13. The system of claim 1, wherein the graphical interface item is updateable by the user.

14. The system of claim 13, further comprising a software application configured to execute on a personal computer, wherein the software application is configured to allow the user to update the graphical interface item of the portable electronic device.

15. The system of claim 1, wherein the associated display is a touch screen display and the touch screen display allows the user to select a given soft button by touching the touch screen display.

16. The system of claim 1, wherein the other portion of software is further configured to communicate a collection of information to the different electronic device via the physical interface such that the user can utilize the different electronic device to select an audio information source that is an audio file saved in the memory.

17. An audio system, comprising:
a portable electronic device that has a display, a memory, and a processor;
software saved at the portable electronic device and configured to direct the portable electronic device to save an audio file in the memory, to associate the audio file with a name, to include the name in a graphical menu of available content, to present the name on the display of the portable electronic device, and to communicate a collection of information comprising the name to a different electronic device that has an associated display such that a user can interact with the different electronic device: (1) to navigate through a plurality of audio files; (2) to view at least a portion of the graphical menu on the associated display, wherein the portion comprises the name; and (3) to select an available audio file for processing; and
wherein the portable electronic device is configured to communicate interface information to the different electronic device in order to allow the user to view the graphical menu on the associated display in a graphical user interface that includes a plurality of preprogramed soft buttons that are linked to respective audio information sources.

18. The system of claim 17, wherein the portable electronic device is a cellular telephone.

19. The system of claim 17, further comprising the different electronic device, wherein the different electronic device is a home stereo component.

20. The system of claim 17, further comprising the different electronic device, wherein the different electronic device is an automobile stereo component.

21. The system of claim 17, wherein the portable electronic device is configured to communicate interface information to the different electronic device in order to allow the user to view the graphical menu in its entirety on the associated display.

22. The system of claim 17, wherein the associated display is a touch screen display and the touch screen display is operable as a user interface mechanism.

23. The system of claim 17, further comprising a mounting location on the portable electronic device that includes a physical interface configured to communicatively couple the portable electronic device to the different electronic device.

24. The system of claim 23, wherein the physical interface is configured to couple a power supply associated with the different electronic device to a local power supply of the portable electronic device.

25. The system of claim 17, wherein the software is embedded in the portable electronic device as firmware.

26. The system of claim 17, wherein the memory is flash memory.

27. The system of claim 17, further comprising:
a mounting location on the portable electronic device that includes a physical interface configured to communicatively couple the portable electronic device to the different electronic device; and
a mount configured to communicatively couple to the different electronic device and to engage the physical interface.

28. An audio system, comprising:
an automobile having a sound system that includes an electronic device with an associated display and a user interface mechanism;
a mount communicatively coupled to the electronic device and configured to engage a physical interface of a portable electronic device that has a display, a memory, a processor, and software saved at the portable electronic device and configured to direct the portable electronic device to save an audio file in the memory, to associate the audio file with a name, to include the name in a menu of available content, to present the name on the display of the portable electronic device, and to communicate a collection of information comprising the name to the electronic device such that a user can interact with the electronic device: (1) to navigate through a plurality of audio files; (2) to view at least a partial representation of the menu on the associated display; and (3) to select an available audio file for processing; and
wherein the electronic device is configured to receive the collection of information and to present the partial representation of the menu on the associated display, further wherein the partial representation of the menu is presented on the associated display in a graphical user interface that includes a plurality of preprogrammed soft buttons that are linked to respective audio information sources.

29. The system of claim 28, wherein the electronic device is configured to receive the collection of information and to present the name on the associated display by software embedded in the electronic device as firmware.

30. The system of claim 28, wherein the plurality of preprogrammed soft buttons are all viewable on the associated display at the same time and the respective audio information sources are separate files saved in the memory.

31. The system of claim 30, wherein the associated display is a touch screen display and the touch screen display is the user interface mechanism.

32. The system of claim 31, wherein the user interface mechanism allows the user to navigate through a plurality of audio files saved in the memory and to select the audio file for processing.

33. The system of claim 28, wherein the user interface mechanism allows the user to navigate through the plurality of audio files and to select the available audio file for processing.

34. The system of claim 28, wherein the associated display and the user interface mechanism are integrated into a console of the automobile.

35. The system of claim 34, wherein a portion of the mount that is configured to engage the physical interface of the portable electronic device is not integrated into the console, further comprising a cable at least partially couples the portion of the mount that is configured to engage the physical interface of the portable electronic device and an other portion of the mount that is communicatively coupled to the electronic device.

* * * * *

(12) INTER PARTES REEXAMINATION CERTIFICATE (1493rd)
United States Patent
White et al.

(10) Number: US 7,324,833 C1
(45) Certificate Issued: Jan. 26, 2018

(54) SYSTEM AND METHOD FOR CONNECTING A PORTABLE AUDIO PLAYER TO AN AUTOMOBILE SOUND SYSTEM

(75) Inventors: Russell W. White, Austin, TX (US); Kevin R. Imes, Austin, TX (US)

(73) Assignee: AFFINITY LABS OF TEXAS, LLC, Austin, TX (US)

Reexamination Request:
No. 95/001,264, Nov. 13, 2009

No. 90/010,333, Nov. 7, 2008

Reexamination Certificate for:
Patent No.: 7,324,833
Issued: Jan. 29, 2008
Appl. No.: 10/947,755
Filed: Sep. 23, 2004

Related U.S. Application Data

(63) Continuation of application No. 09/537,812, filed on Mar. 28, 2000, now Pat. No. 7,187,947.

(51) Int. Cl.
*H04Q 7/20* (2006.01)
*G06F 3/0488* (2013.01)
(Continued)

(52) U.S. Cl.
CPC .......... *G06F 3/0488* (2013.01); *G06F 3/0482* (2013.01); *G06F 3/04842* (2013.01);
(Continued)

(58) Field of Classification Search
USPC ...................................................... 455/556.1
See application file for complete search history.

(56) References Cited

To view the complete listing of prior art documents cited during the proceedings for Reexamination Control Numbers 95/001,264 and 90/010,333, please refer to the USPTO's public Patent Application Information Retrieval (PAIR) system under the Display References tab.

*Primary Examiner* — Colin LaRose

(57) ABSTRACT

An audio system and method are disclosed. A system incorporating teachings of the present disclosure may include, for example, an electronic device having a display, a memory, an audio file player, and a housing component at least partially defining a cavity in which the memory and the audio file player are secured. In one embodiment, the electronic device may be a portable MP3 player. The system may also include a processor or playlist engine that can maintain a first playlist and a second playlist. In practice, the first playlist may include a selection of audio content having a corresponding audio file saved in the memory of the electronic device. In one embodiment, the system may also include an automobile having an automobile sound system that has a speaker and an in dash sound system component, which may be removably coupled to the electronic device via a cable. The in dash sound system component may have a selector, which may be, for example, a button, that allows a user to select the first playlist for outputting via the speaker. The cable interconnecting the electronic device and the in dash sound system component may be capable of providing power to the electronic device in addition to communicatively coupling the electronic device to the automobile sound system.

Attention is directed to the decision of *Affinity Labs of Texas, LLC v. BMW North America LLC, et al.*, 9:08-cv-164-RC (E.D. TX). In re: Affinity Labs of Texas, LLC, 2016-1092, 2016-1172(Fed. Cir., May 5, 2017) relating to this patent. This reexamination may not have resolved all questions raised by this decision. See 37 CFR 1.552(c) for *ex parte* reexamination and 37 CFR 1.906(c) for *inter partes* reexamination.

At the time of issuance and publication of this certificate, the patent remains subject to pending reexamination control number 95/001,223 filed Sep. 22, 2009. The claim content of the patent may be subsequently revised if a reexamination certificate issues from the reexamination proceeding.

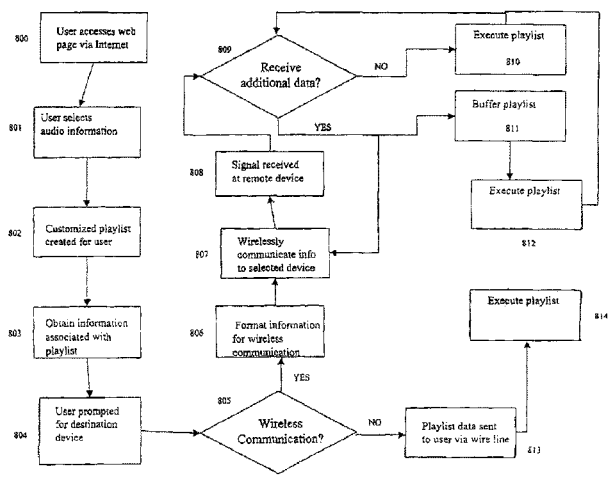

(51) Int. Cl.
  *G06F 3/0482* (2013.01)
  *H04L 29/06* (2006.01)
  *G06F 3/0484* (2013.01)
  *G06Q 30/02* (2012.01)
  *H04W 4/06* (2009.01)
  *H04W 88/06* (2009.01)
  *H04M 1/60* (2006.01)
  *G11B 31/02* (2006.01)
  *H04W 84/12* (2009.01)
  *H04M 1/725* (2006.01)
  *H04H 60/27* (2008.01)

(52) U.S. Cl.
  CPC ..... *G06Q 30/0267* (2013.01); *G06Q 30/0269* (2013.01); *G11B 31/02* (2013.01); *H04L 65/60* (2013.01); *H04M 1/6091* (2013.01); *H04W 4/06* (2013.01); *H04W 84/12* (2013.01); *H04W 88/06* (2013.01); *H04H 60/27* (2013.01); *H04M 1/7253* (2013.01); *H04M 1/7255* (2013.01); *H04M 1/72547* (2013.01); *H04M 1/72558* (2013.01); *H04M 1/72561* (2013.01); *H04M 2250/64* (2013.01)

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 28-35 is confirmed.

Claims 1-27 are cancelled.

New claims 36-40 are added and determined to be patentable.

36. *An audio system, comprising:*
*a portable electronic device having a display, a memory, and an audio file player;*
*a first portion of software saved at the portable electronic device and configured to initiate a displaying of a graphical interface item on the display, the graphical interface item comprising a name associated with an audio file saved in the memory;*
*a mounting location on the portable electronic device that includes a physical interface configured to communicatively couple the portable electronic device to a different electronic device having an associated display;*
*an other portion of software saved at the portable electronic device and configured to communicate a representation of the graphical interface item to the different electronic device via the physical interface to facilitate a displaying of the representation on the associated display, wherein the portable electronic device is configured to communicate interface information to the different electronic device in order to allow a user to view at least a partial representation of a graphical user interface that includes the graphical interface item on the associated display, wherein the graphical user interface comprises a plurality of preprogramed soft buttons that are linked to respective audio information sources;*
*wherein the graphical interface item is updateable by the user; and*
*a software application configured to execute on a personal computer, wherein the software application is configured to allow the user to update the graphical interface item of the portable electronic device, wherein the software application is further configured to allow the user to join a group including other users that select a genre of music, and further to allow the user to correspond with at least one of the other users, and to access a list of additional users that provide playlists of songs.*

37. *The system of claim 36, wherein the software application is further configured to allow the user to interact with a guest musical artist via a web page.*

38. *An audio system, comprising:*
*a portable electronic device that has a display, a memory, and a processor;*
*software saved at the portable electronic device and configured to direct the portable electronic device to save an audio file in the memory, to associate the audio file with a name, to include the name in a graphical menu of available content, to present the name on the display of the portable electronic device, and to communicate a collection of information comprising the name to a different electronic device that has an associated display such that a user can interact with the different electronic device:*
*(1) to navigate through a plurality of audio files;*
*(2) to view at least a portion of the graphical menu on the associated display, wherein the portion comprises the name; and*
*(3) to select an available audio file for processing; and*
*wherein the portable electronic device is configured to communicate interface information to the different electronic device in order to allow the user to view the graphical menu on the associated display in a graphical user interface that includes a plurality of preprogramed soft buttons that are linked to respective audio information sources, wherein the portable electronic device is configured to switch between a set of communication rates at which the portable electronic device can wirelessly receive a first portion and a second portion of information representing media content from a network based resource, wherein the set of communication rates comprises at least a first data rate and a second data rate that is slower than the first data rate, wherein the portable electronic device is configured to receive at least one portion of the information in a compressed format and to process the at least one portion; and*
*another portion of software configured:*
*(1) to allow the user to join a group including other users that select a genre of music;*
*(2) to allow the user to correspond with at least one of the other users;*
*(3) to access a list of additional users that provide playlists of songs; and*
*(4) to allow the user to interact with a guest musical artist via a web page.*

39. *The system of claim 35, wherein the electronic device includes:*
*(1) a radio receiver configured to receive in-band on-channel radio transmissions;*
*(2) a bus; and*
*(3) an interface configured to facilitate a communicative coupling of the portable electronic device to the bus via the mount.*

40. *The system of claim 35, wherein the portion of the mount that is configured to engage the physical interface of the portable electronic device is configured to mate with the physical interface having a single non-circular contacting interface such that the portable electronic device is powered by a power system of the automobile, the cable having multiple conductive elements, and at least one of the multiple conductive elements is coupled to the sound system component behind a dashboard of the automobile.*

* * * * *